Aug. 10, 1954  W. J. CASEY III  2,685,943
BRAKE SUSPENSION
Filed Sept. 18, 1951  2 Sheets-Sheet 1

INVENTOR.
William J. Casey, III.
BY
Arthur O. B. Garner
Atty.

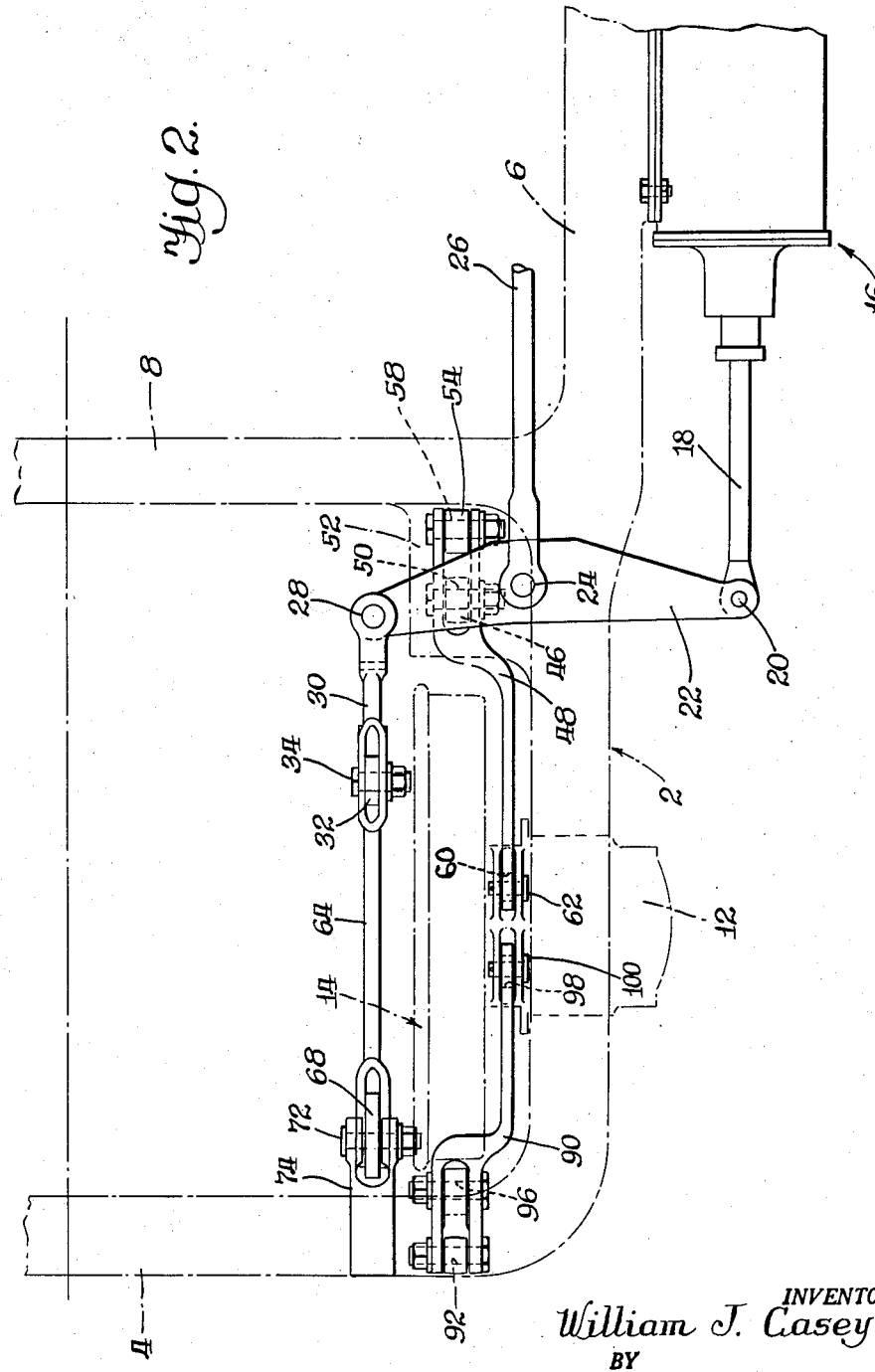

Patented Aug. 10, 1954

2,685,943

UNITED STATES PATENT OFFICE 2,685,943

BRAKE SUSPENSION

William J. Casey III, Chicago, Ill., assignor to American Steel Foundries, Chicago, Ill., a corporation of New Jersey Application September 18, 1951, Serial No. 247,099

19 Claims. (Cl. 188—56)

My invention relates to improvements in brakes and particularly to a novel brake suspension rigging preferably applied to a railway car truck brake system.

An object of my invention is to devise a brake suspension rigging capable of providing substantially uniform shoe wear over the entire length of the shoe notwithstanding the radial wear of the shoe and the vertical movement of the truck frame relative to the wheels.

Another object of my invention is to apply such a brake suspension rigging to a car truck having beam type clasp brakes.

My invention embodies other novel features, details of construction and arrangement of parts which are hereinafter set forth in the specification and claims and illustrated in the accompanying drawings which show a preferred embodiment of the invention, wherein:

Figure 2 is a top plan view of the same.

Figures 1, 3:
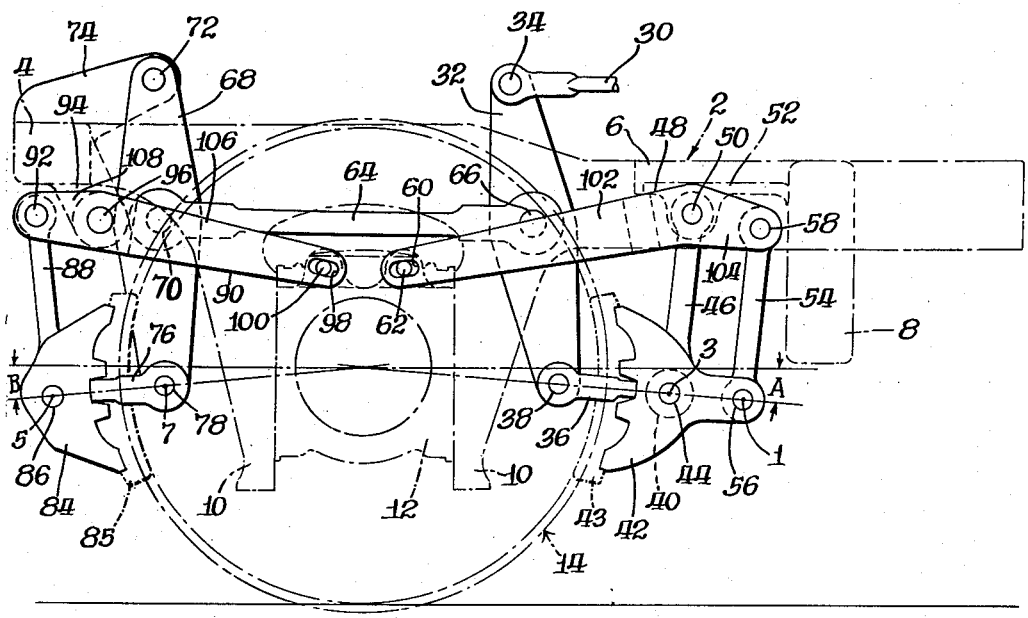
Figure 1 is a side elevational view of a railway car truck with my novel brake suspension rigging applied thereto, only one-quarter of the truck being shown inasmuch as the rigging is symmetrical about both longitudinal and transverse center lines of the truck.
Figure 3 is an end elevational view taken from the left as seen in Figure 1.

In each of the figures certain details have been omitted where they are more clearly seen in other of the figures.

Referring now to the drawings for a better understanding of the invention, my novel brake suspension rigging is shown as integrated with the clasp brake for one of the wheels of a conventional railway car truck, as hereinafter described. Numeral 2 generally indicates a conventional spring-supported truck frame comprising end and side rails 4 and 6 at each end and side thereof, respectively, together with a transom 8 at each side of the transverse center line. Side rail 6 is provided at each of its opposite ends with a pair of depending jaws 10, 10, in driving engagement with a journal box 12 which journals a wheel and axle assembly 14 and supports an end of an equalizer (not shown).

A piston and cylinder assembly 16 is mounted on the outboard side of the side rail 6 medial the ends thereof, the piston having a piston rod 18 extending longitudinally of the truck and having a pivotal connection, as at 20, with the outboard end of a live cylinder lever 22 extending transversely of and overlying the side rail. The lever 22 is slidably supported on a plate or bracket (not shown) which is secured to the side rail 6. Lever 22 is pivotally connected intermediate its ends, as at 24, to one end of a pull rod 26, the latter having a pivotal connection (not shown) at its opposite end to a dead cylinder lever (not shown). The inner end of the live cylinder lever 22 is pivoted, as at 28, to one end of a pull rod 30 which has a pivotal connection at its opposite end with the upper end of a vertically disposed live truck lever 32 as at 34.

Live truck lever 32 is pivoted at its lower end to a fulcrum or bracket 36, as at 38, which is preferably secured to a solid brake beam 40. The beam 40 extends transversely of the truck and is provided with a trunnion at each of its ends having a brake head 42 pivotally mounted thereon, as at 44. Brake head 42 carries a shoe 43 for engagement with the wheel tread. The lower end of a brake hanger 46 is also pivoted to the trunnion at 44. The upper end of brake hanger 46 and the medial portion of a crank 48 are both pivoted at 50 to a bracket 52 which is formed integral with the side rail and the adjacent transom 8. A link 54 is pivoted at its lower end to brake head 42 as at 56; the upper end of link 54 is pivoted as at 58 to one end of crank 48. The other end of crank 48 is provided with a slot 60 that slidably engages a pin 62 which is retained in journal box 12.

The live truck lever 32 is pivoted medial its ends to one end of a horizontally disposed pull rod 64, as at 66; the other end of pull rod 64 is pivoted to a vertically disposed dead truck lever 68, as at 70. The upper end of lever 68 is pivotally fulcrumed, as at 72, to a bracket 74 which is connected to the end rail 4. The lower end of lever 68 is pivoted to a bracket or fulcrum 76, as at 78, which is preferably secured to a solid brake beam 80 that extends transversely of the truck.

Beam 80 is provided with a trunnion 82 at each of its ends for pivotally mounting a brake head 84 thereon, as at 86. Brake head 84 carries a shoe 85 for engagement with the wheel tread. The lower end of a brake hanger 88 is also pivotally connected to trunnion 82 at 86. The upper end of hanger 88 is pivoted to one end of a crank 90, as at 92, which is pivotally fulcrumed to an end rail bracket 94, as at 96. The other end of crank 90 is provided with a slot 98 that slidably engages a pin 100 which is retained in journal box 12.

In the brake suspension rigging adjacent transom 8, link 54 and brake hanger 46 are so proportioned and positioned that the axes 1, 3 and the wheel axis substantially lie in a common plane when brake head 42 moves inwardly and the angle A changes. Arms 102 and 104 of crank 48 are so proportioned that vertical movement of the wheel 14 relative to the truck frame 2 will cause head 43 to be tilted so that the axes 1, 3 and the wheel axis remain in substantially the same plane. Vertical movement of the wheel 14 relative to the truck frame 2 also results in the sliding engagement of the aperture 60 and pin 62.

In the brake suspension rigging adjacent end rail 4 hanger lever 88, dead truck lever 68, and crank 90 are so proportioned and positioned that axes 5, 7 and the wheel axis substantially lie in a common plane when brake head 84 moves inwardly and the angle B changes. Arms 106 and 108 of crank 90 are so proportioned that vertical movement of the wheel 14 relative to the truck frame 2 will cause head 84 to be tilted so that axes 5, 7 and the wheel axis remain in substantially the same plane. Vertical movement of wheel 14 relative to the truck frame 2 also results in the sliding engagement of the aperture 98 and pin 100.

Thus it will be seen that the purpose of this device is accomplished, that is, to ensure uniform shoe wear over the entire length of the shoe by positioning the brake shoe positively with respect to the wheel regardless of the radial wear condition of the shoe or the relative position of the wheel and the truck frame.

Additionally, the brake rigging operates in the usual manner in that energizing of the cylinder 16 causes the piston rod 18 to move to the left, as seen in Figure 2. Leftward movement of the rod 18 causes the lever 22 to rotate in a clockwise direction which in turn causes brake lever 32 to rotate in a clockwise direction, as seen in Figure 1. Movement of lever 32 brings the brake beam 40 toward and the carried shoe assembly 43 into engagement with one side of the related wheel. Additionally, clockwise movement of the lever 32 causes the rod connected brake lever 68 to pivot in a counterclockwise direction about its fulcrum 72, whereby the connected brake beam 80 is drawn toward and the carried shoe assembly 85 is brought into engagement with the other side of the wheel. De-energizing of the brake cylinder 16 causes the mentioned links and rods to operate in the reverse direction.

I claim:

1. In a railway car truck having a spring-supported frame with a journal box slidably engaged therewith and a friction member; the combination of a crank pivotally fulcrumed intermediate its ends to said frame and operatively connected at one of its ends to said journal box and operatively connected at its other end to said friction member, said friction member being pivoted to said frame coaxially with said crank.

2. In a railway car truck having a spring-supported frame with a journal box slidably engaged therewith and a friction member; the combination of a crank pivotally fulcrumed intermediate its ends to said frame and operatively connected at one of its ends to said journal box and operatively connected at its other end to said friction member.

3. In a brake arrangement having a spring-supported member and journaling means slidably engaged therewith, a crank fulcrumed intermediate its ends to said member and operatively connected at one of its ends to the journaling means, a brake hanger pivotally connected to said member, friction means pivotally connected to said hanger, and a link operatively connected to said friction means and to the other end of said crank.

4. In a brake arrangement having a spring-supported frame with a journal box slidably engaged therewith, a crank pivotally fulcrumed intermediate its ends to said frame and operatively connected at one of its ends to the journal box, a brake hanger having one of its ends pivoted to the other end of the crank, a lever having one of its ends pivoted to the frame, friction means pivotally connected to the other end of said hanger, and a member pivoted to the other end of said lever and operatively connected to the pivotal connection between the hanger and friction means.

5. In a clasp brake arrangement for a railway car truck having a spring-supported frame with a journal box slidably engaged therewith, a crank pivotally fulcrumed intermediate its ends to said frame and slidably connected at one of its ends to said journal box, a brake hanger having one of its ends pivoted to the other end of the crank, a brake head pivotally connected to the other end of the hanger, another crank pivotally fulcrumed intermediate its ends to said frame and slidably connected at one of its ends to the journal box, another brake hanger pivotally connected at one of its ends to the frame, another brake head pivotally connected to the other end of said second mentioned hanger, a link pivotally connected at one of its ends to the second mentioned brake head and operatively connected to the other end of said second mentioned crank, and interconnected live and dead truck levers operatively connected to both of said brake heads.

6. In a clasp brake arrangement for a railway car truck having a spring-supported frame with a journal box operatively engaged therewith, a crank pivotally fulcrumed intermediate its ends to said frame and operatively connected at one of its ends to the journal box, a brake hanger having one of its ends pivoted to the other end of the crank, a brake head pivoted to the other end of the hanger, a lever having one of its ends pivoted to the frame, a member pivoted to the other end of said lever and operatively connected to the pivotal connection between the hanger and head, another crank pivotally fulcrumed intermediate its ends to said frame, and operatively connected at one of its ends to the journal box, another brake hanger pivotally connected to the frame, another brake head pivotally connected to said second mentioned hanger, a link operatively connected to the second mentioned brake head and to the other end of the second mentioned crank, a live truck lever operatively connected to said second mentioned brake head, and a pull rod interconnecting said first mentioned lever and said live truck lever.

7. In a brake arrangement having a spring-supported frame with a journal box operatively engaged therewith, a crank pivotally fulcrumed intermediate its ends to said frame and operatively connected at one of its ends to the journal box, a brake hanger having one of its ends pivoted to the other end of the crank, a brake head pivoted to the other end of the hanger, a lever having one of its ends pivoted to the frame, and a member pivoted to the other end of said lever and operatively connected to the pivotal connection between the hanger and head.

8. In a brake arrangement for a spring-supported frame with a journal box operatively engaged therewith for journaling the axle of a wheel and axle assembly, a crank fulcrumed intermediate its ends to said frame and operatively connected at one of its ends to the journal box, a brake hanger pivotally connected at one of its ends to the frame, a brake head pivotally connected to the other end of said hanger, and a member operatively connected at one of its ends to the other end of the crank and pivotally connected at its other end to the brake head, said wheel and axle assembly and the pivotal connection between the brake head and brake hanger and the pivotal connection between said member and brake head, each having an axis substantially disposed in a common plane.

9. In a brake arrangement having a supporting member and a journal box, a crank fulcrumed intermediate its ends to the supporting member and operatively connected at one of its ends to the journal box, a brake hanger pivotally connected to the frame, a brake head pivotally connected to the hanger, and a member operatively connected to the brake head and to the other end of the crank.

10. In a railway car truck having a spring-supported frame with a journal box slidably engaged therewith, a crank fulcrumed intermediate its ends to the frame and operatively engaged at one of its ends with the journal box, a brake hanger pivotally connected to the frame, a brake head pivotally connected to the hanger, and a link operatively connected to the brake head and to the other end of the crank.

11. In a railway car truck having a spring-supported frame with a journal box slidably engaged therewith, a crank pivotally fulcrumed intermediate its ends to the frame and slidably engaged at one of its ends with the journal box, a brake hanger pivotally connected to the frame, a brake head pivotally connected to the hanger, and a link operatively connected to the brake head and to the other end of the crank.

12. In a railway car truck having a spring-supported frame with a journal box slidably engaged therewith, a crank pivotally fulcrumed intermediate its ends to the frame and slidably engaged at one of its ends with the journal box, a brake hanger pivotally connected to the frame, a brake head pivotally connected to the hanger, and a link having one of its ends operatively connected to the brake head and having its opposite end pivotally connected to the other end of the crank.

13. In a railway car truck having a spring-supported frame with a journal box slidably engaged therewith, a crank pivotally fulcrumed to the frame and slidably engaged at one of its ends with the journal box, a brake hanger pivotally connected to the frame and having a pivotal axis in common with the crank, a brake head pivoted to the other end of the hanger, a brake beam extending transversely of the truck and having a trunnion at its end pivotally connected to said other end of the hanger, and a link spaced from the hanger and having an end pivotally connected to the other end of the crank and having its other end pivotally connected to the brake head.

14. In a railway car truck having a spring-supported frame with a journal box slidably engaged therewith, a crank pivotally fulcrumed to the frame and slidably engaged at one of its ends with the journal box, a brake hanger pivotally connected to the frame, a brake head pivoted to the other end of the hanger, a brake beam extending transversely of the truck and having a trunnion at its end pivotally connected to said other end of the hanger, and a link spaced from the hanger and having an end pivotally connected to the other end of the crank and having its other end pivotally connected to the brake head.

15. In a railway car truck having a spring-supported frame with a journal box slidably engaged therewith, a crank pivotally fulcrumed to the frame intermediate its ends and slidably engaged at one of its ends with the journal box, a brake hanger having one end thereof pivotally connected to the other end of the crank, a brake beam extending transversely of the truck and having a trunnion at its end, said trunnion being pivotally connected to the other end of the brake hanger, a brake head pivotally connected to the trunnion, a dead truck lever pivotally connected to the truck at one of its ends, a member rigidly connected at one of its ends to said beam and operatively connected at its other end to the other end of the lever.

16. In a railway car truck having a spring-supported frame with the journal box slidably engaged therewith, a crank fulcrumed to the frame and slidably engaged at one of its ends with the journal box, a brake hanger pivotally connected to the frame, a brake head pivoted to the other end of the hanger, a link spaced from the hanger and pivotally connected to the other end of the crank and operatively connected to the brake head, and means connected to the brake head for actuation thereof by a braking force.

17. In a railway car truck having a frame flexibly supported from a wheel and axle assembly, said assembly having a journal box on each of its ends slidably associated with the frame; the combination of cranks fulcrummed to the frame intermediate their ends, each crank having one of its ends connected to the journal box, brake heads disposed on opposite sides of said assembly having friction elements engageable with the wheel, a brake hanger on one side of said assembly pivotally supporting the related head from the frame, live and dead truck levers disposed on opposite sides of the assembly and having operative connections to the related brake heads, links disposed on opposite sides of the assembly operatively connecting the ends opposite the mentioned ends of said cranks and the related brake heads, a pull rod interconnecting the live and dead truck levers, and power means operatively connected to the live levers whereby upon actuation of same the friction elements may be urged to engage said wheel.

18. A railway car truck according to claim 17, including brake beams disposed on opposite sides of said assembly and extending transversely of the truck, each brake beam having a trunnion on the end thereof pivotally connected to the related brake head.

19. In a railway car truck having a spring-supported frame with a journal box slidably engaged therewith and friction member; the combination of a crank having spaced connections to the journal box, the frame and the member, respectively, at least one of said connections being pivoted and at least one of said connections being slidable.

References Cited in the file of this patent

UNITED STATES PATENTS

| Number | Name | Date |
| --- | --- | --- |
| 1,796,605 | Leggemann et al. | Mar. 17, 1931 |
| 2,258,337 | Mueller | Oct. 7, 1941 |
| 2,275,916 | Mueller | Mar. 10, 1942 |
| 2,360,967 | Mueller | Oct. 24, 1944 |